United States Patent
Liu et al.

(10) Patent No.: US 12,513,645 B2
(45) Date of Patent: Dec. 30, 2025

(54) TAU METHOD AND DEVICE BASED ON MOBILE IAB NODE

(71) Applicant: VIVO MOBILE COMMUNICATION CO., LTD., Chang'an Dongguan (CN)

(72) Inventors: Jinhua Liu, Chang'an Dongguan (CN); Wei Bao, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 494 days.

(21) Appl. No.: 17/844,187

(22) Filed: Jun. 20, 2022

(65) Prior Publication Data
US 2022/0330196 A1 Oct. 13, 2022

Related U.S. Application Data

(63) Continuation of application No. PCT/CN2020/137736, filed on Dec. 18, 2020.

(30) Foreign Application Priority Data

Dec. 20, 2019 (CN) .......................... 201911329069.8

(51) Int. Cl.
*H04W 60/04* (2009.01)
*H04W 8/00* (2009.01)
(Continued)

(52) U.S. Cl.
CPC ........... *H04W 60/04* (2013.01); *H04W 8/005* (2013.01); *H04W 68/005* (2013.01); *H04W 84/005* (2013.01)

(58) Field of Classification Search
CPC ... H04W 60/04; H04W 8/005; H04W 68/005; H04W 8/06; H04W 8/24; H04W 48/14;
(Continued)

(56) References Cited

U.S. PATENT DOCUMENTS

| 2011/0171979 A1* | 7/2011 | Rune ..................... H04W 24/02 455/458 |
| 2013/0137434 A1* | 5/2013 | Godin ..................... H04W 8/24 455/436 |

(Continued)

FOREIGN PATENT DOCUMENTS

| CN | 102118730 A | 7/2011 |
| CN | 102118760 A | 7/2011 |

(Continued)

OTHER PUBLICATIONS

3GPP "Mobile relay architecture comparison from the perspective of TAU," 3GPP TSG-RAN WG3 Meeting #75 R3-120027, Feb. 2012.

(Continued)

*Primary Examiner* — Shah M Rahman
(74) *Attorney, Agent, or Firm* — Stites & Harbison, PLLC; Jeffrey A. Haeberlin

(57) ABSTRACT

Embodiments of the present disclosure disclose a TAU method and device based on a mobile IAB node to solve the problem that a terminal device in a cell provided by the mobile IAB node is prone to cause a TAU storm. The method is executable by the mobile IAB node, and includes: receiving first TAC list information; and initiating a TAU procedure based on the first TAC list information in a case that a new TAI is discovered, where the TAU procedure is used by a first AMF to update location information of the terminal device in the cell provided by the mobile IAB node.

20 Claims, 6 Drawing Sheets

(51) Int. Cl.
*H04W 68/00* (2009.01)
*H04W 84/00* (2009.01)

(58) Field of Classification Search
CPC . H04W 84/047; H04W 48/12; H04W 84/005; H04W 8/14; H04W 60/02
See application file for complete search history.

(56) References Cited

U.S. PATENT DOCUMENTS

| | | | |
|---|---|---|---|
| 2013/0344890 A1 | 12/2013 | Hahn et al. | |
| 2014/0135006 A1* | 5/2014 | Yu | H04W 36/0058 455/436 |
| 2014/0206352 A1 | 7/2014 | Mochizuki et al. | |
| 2014/0286312 A1* | 9/2014 | Xu | H04W 36/0061 370/331 |
| 2014/0301371 A1* | 10/2014 | Maeda | H04W 36/0016 370/331 |
| 2015/0063199 A1 | 3/2015 | Wang et al. | |
| 2015/0131618 A1* | 5/2015 | Chen | H04W 84/005 370/332 |
| 2019/0132740 A1 | 5/2019 | De et al. | |
| 2020/0120571 A1* | 4/2020 | Zong | H04W 8/08 |
| 2020/0187144 A1* | 6/2020 | Ying | H04W 48/04 |
| 2020/0267632 A1* | 8/2020 | Lindheimer | H04W 48/16 |
| 2021/0076306 A1* | 3/2021 | Tamura | H04W 8/24 |
| 2023/0337213 A1* | 10/2023 | Badic | G05D 1/467 |

FOREIGN PATENT DOCUMENTS

| | | | | |
|---|---|---|---|---|
| CN | 102196401 A | 9/2011 | | |
| CN | 103108303 A | 5/2013 | | |
| CN | 103220656 A | 7/2013 | | |
| CN | 110324892 A | * 10/2019 | ............ | H04W 60/04 |
| CN | 110536375 A | 12/2019 | | |
| CN | 112153647 A | * 12/2020 | ........ | H04W 36/0038 |
| JP | 2018528626 A | 9/2018 | | |
| WO | 2012/124894 A1 | 9/2012 | | |
| WO | 2013/022067 A1 | 2/2013 | | |
| WO | 2019/098118 A1 | 5/2019 | | |

OTHER PUBLICATIONS

3GPP "3rd Generation Partnership Project; Technical Specification Group Services and System Aspects; General Pack Radio Service (GPRS) enhancements for Evolved Universal Terrestrial Radio Access Network (E-UTRAN) access," Release 16, 3GPP TS 23.401 v16.4.0, Sep. 2019.
3GPP "Views on Rel-17 IAB," 3GPP TSG RAN Meeting #86 RP-192577, Dec. 2019.
China National Intellectual Property Administration, International Search Report issued in corresponding Application No. PCT/CN2020/137736 mailed Mar. 17, 2021.
3GPP TSG-RAN3 Meeting #106, R3-196417, Reno, Nevada, USA, Nov. 18-22, 2019. Reply LS on LS on the IAB-indication to core network.
3GPP TSG RAN Meeting #85, RP-191865, Newport Beach, USA, Sep. 16-20, 2019. Rel-17 IAB email discussion outline.
European Patent Office, Extended European Search Report issued in corresponding Application No. 20901277.2, dated Jan. 20, 2023.
Intellectual Property India, Examination Report issued in corresponding Application No. 202217040645, dated Dec. 27, 2022.

* cited by examiner

800

Send first TAC list information, where the first TAC list information is used by a mobile IAB node to initiate a TAU procedure in a case that a new TAI is discovered, the TAU procedure is used by a first AMF to update location information of a terminal device, and the terminal device resides in a cell provided by the mobile IAB node ~S802

Update location information of a terminal device in a case that a mobile IAB node initiates a TAU procedure ~S902

FIG. 9

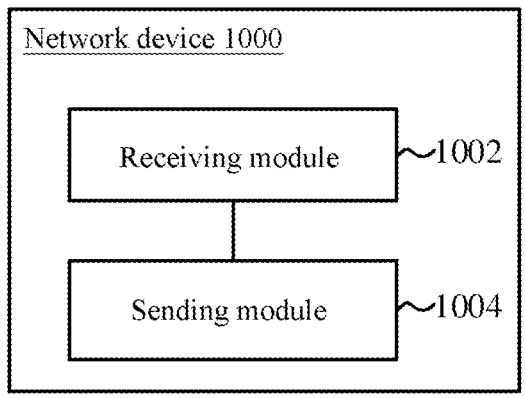

FIG. 10

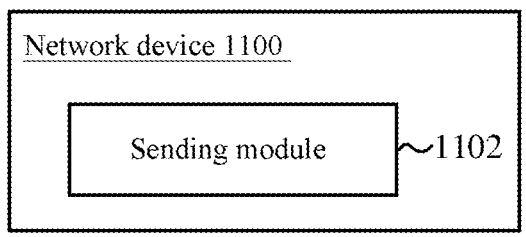

FIG. 11

TAU METHOD AND DEVICE BASED ON MOBILE IAB NODE

CROSS-REFERENCE TO RELATED APPLICATIONS

The present disclosure is a continuation of International Application No. PCT/CN2020/137736, filed on Dec. 18, 2020, which claims priority to Chinese Patent Application No. 201911329069.8, filed with the National Intellectual Property Administration, PRC on Dec. 20, 2019, which are incorporated herein by reference in their entireties.

TECHNICAL FIELD

Embodiments of the present disclosure relate to the field of communications, and in particular, to a tracking area update (Tracking Area Update, TAU) method and device based on a mobile Integrated Access and Backhaul (Integrated Access and Backhaul, IAB) node.

BACKGROUND

With the continuous development of the mobile communication technology and transportation technology, users have a stronger desire for a communication service during travel by a means of transport. For example, users expect to be able to work, watch videos, play games or the like on the Internet during travel by high-speed railway. Mobile IAB technology is shaping up to meet the demand.

The mobile IAB node may be referred to as a mobile IAB relay base station. When installed in a means of transport (such as high-speed railway, bus, or ship), the mobile IAB node can provide a high-quality instant communication service for passenger users.

Although convenient for carrying out a communication service, the mobile IAB brings some problems that are avoided by a fixed IAB node. One of the problems is TAU storm. For example, a high-speed rail train may accommodate more than a thousand users. Mobile IAB nodes are installed in the high-speed rail train. If the high-speed rail train traverses from a tracking area (Tracking Area, TA) 1 to TA 2, but TA2 is not in a TAI list (TAI list) of a terminal device (of a user), then the terminal device may trigger a TAU procedure after entering the TA 2. This gives rise to a massive random access load on a radio access network and a massive signaling load on the core network. In addition, the user may traverse a plurality of TAs during a travel by high-speed rail. Excessive TAU procedures initiated by the terminal device increase power consumption significantly.

SUMMARY

Embodiments of the present disclosure are to provide a TAU method and device based on a mobile IAB node.

According to a first aspect of the present disclosure, a TAU method based on a mobile IAB node is provided. The method is executed by the mobile IAB node, and includes:
  receiving first TAC list information; and
  initiating a TAU procedure based on the first TAC list information in a case that a new TAI is discovered.

The TAU procedure is used by a first AMF to update location information of a terminal device, and the terminal device resides in a cell provided by the mobile IAB node.

According to a second aspect of the present disclosure, a TAU method based on a mobile IAB node is provided. The method is executed by a donor IAB node, and the method includes:
  sending first TAC list information.

The first TAC list information is used by a mobile IAB node to initiate a TAU procedure in a case that a new TAI is discovered. The TAU procedure is used by a first AMF to update location information of a terminal device. The terminal device resides in a cell provided by the mobile IAB node.

According to a third aspect of the present disclosure, a TAU method based on a mobile IAB node is provided. The method is executed by a first AMF, and includes:
  updating location information of a terminal device in a case that the mobile IAB node initiates a TAU procedure.

The terminal device resides in a cell provided by the mobile IAB node. The TAU procedure is initiated by the mobile IAB node based on received first TAC list information in a case that a new TAI is discovered.

According to a fourth aspect of the present disclosure, a network device is provided. The network device includes:
  a receiving module, configured to receive first TAC list information; and
  a sending module, configured to initiate a TAU procedure based on the first TAC list information in a case that a new TAI is discovered.

The TAU procedure is used by a first AMF to update location information of a terminal device, and the terminal device resides in a cell provided by the mobile IAB node.

According to a fifth aspect of the present disclosure, a network device is provided.

The network device includes:
  a sending module, configured to send first TAC list information.

The first TAC list information is used by a mobile IAB node to initiate a TAU procedure in a case that a new TAI is discovered. The TAU procedure is used by a first AMF to update location information of a terminal device. The terminal device resides in a cell provided by the mobile IAB node.

According to a sixth aspect of the present disclosure, a network device is provided. The network device includes:
  a location update module, configured to update location information of a terminal device in a case that a mobile IAB node initiates a TAU procedure.

The terminal device resides in a cell provided by the mobile IAB node. The TAU procedure is initiated by the mobile IAB node based on received first TAC list information in a case that a new TAI is discovered.

According to a seventh aspect of the present disclosure, a network device is provided. The network device includes a processor, a memory, and a computer program stored in the memory and executable on the processor. When executed by the processor, the computer program implements steps of the TAU method based on a mobile IAB node according to the first aspect to the third aspect.

According to an eighth aspect of the present disclosure, a computer-readable storage medium is provided. The computer-readable storage medium stores a computer program. When executed by a processor, the computer program implements steps of the TAU method based on a mobile IAB node according to the first aspect to the third aspect.

In the embodiments of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

BRIEF DESCRIPTION OF THE DRAWINGS

The drawings described herein are intended to enable a further understanding of this application, and constitute a part of this application. The exemplary embodiments of this application and the description thereof are intended to explain this application, but do not constitute any inappropriate limitation on this application. In the drawings:

FIG. 8 is a schematic flowchart of a TAU method based on a mobile IAB node according to an embodiment of the present disclosure;

FIG. 9 is a schematic flowchart of a TAU method based on a mobile IAB node according to an embodiment of the present disclosure;

FIG. 10 is a schematic structural diagram of a network device according to an embodiment of the present disclosure;

FIG. 11 is a schematic structural diagram of a network device according to another embodiment of the present disclosure;

DETAILED DESCRIPTION

To make the objectives, technical solutions, and advantages of this application clearer, the following describes the technical solutions of this application clearly with reference to specific embodiments and the corresponding accompanying drawings of this application. Apparently, the described embodiments are merely a part of but not all of the embodiments of this application. All other embodiments derived by a person of ordinary skill in the art based on the embodiments of this application without making any creative effort fall within the protection scope of this application. The term "and/or" that links two items in each embodiment hereof means at least one of the two items.

Understandably, the technical solutions in the embodiments of the present disclosure are applicable to various communication systems, for example, Long Term Evolution (Long Term Evolution, LTE) system, LTE Frequency Division Duplex (Frequency Division Duplex, FDD) system, LTE Time Division Duplex (Time Division Duplex, TDD) system, Universal Mobile Telecommunication System (Universal Mobile Telecommunication System, UMTS) or Worldwide Interoperability for Microwave Access (Worldwide Interoperability for Microwave Access, WiMAX) communication system, or a 5G system also known as New Radio (New Radio, NR) system, or a later evolved communication system.

In the embodiments of the present disclosure, the terminal device may include, but is not limited to, a mobile station (Mobile Station, MS), a mobile terminal (Mobile Terminal), a mobile telephone (Mobile Telephone), user equipment (User Equipment, UE), a handset (handset), portable equipment (portable equipment), a vehicle (vehicle), and the like. The terminal device may communicate with one or more core networks by way of a radio access network (Radio Access Network, RAN). For example, the terminal device may be a mobile phone (or also known as a "cell phone"), a computer capable of wireless communication, or the like. Alternatively, the terminal device may be a portable, pocket-sized, handheld, computer built-in, or in-vehicle mobile device.

In the embodiments of the present disclosure, a network device is a device that is deployed in a radio access network to provide a radio communication function for a terminal device. The network device may be a base station. The base station comes in various forms such as macro base station, micro base station, relay station, and access point. In systems in which different radio access technologies are applied, devices that function as a base station may be named differently. For example, in an LTE network, a base station is referred to as an evolved NodeB (Evolved NodeB, eNB, or eNodeB); in a third generation (3rd Generation, 3G) network, a base station is referred to as a Node B (Node B); in a later evolved communication system, a base station is a network device, and so on. The names of the base stations constitute no limitation.

Figure 1:
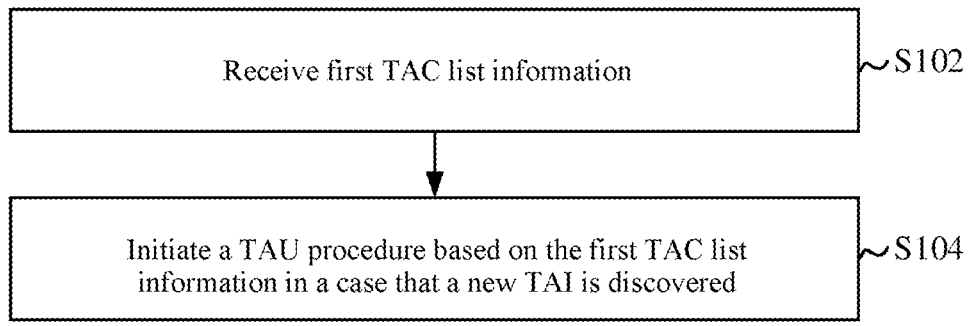
FIG. 1 is a schematic flowchart of a TAU method based on a mobile IAB node according to an embodiment of the present disclosure.

As shown in FIG. 1, an embodiment of the present disclosure provides a TAU method 100 based on a mobile IAB node. The method may be executed by the mobile IAB node, and include the following steps:

S102: Receive first tracking area code (Tracking Area Code, TAC) list (list) information.

Optionally, the first TAC list information (briefly referred to as first TAC list below) is broadcast by a donor IAB node (referred to as donor IAB below), and received by the mobile IAB node. A backhaul link has been established between the donor IAB node and the mobile IAB node; or has not been established between the donor IAB node and the mobile IAB node.

Certainly, in other embodiments, the first TAC list may be broadcast by a network node other than the donor IAB node instead. In this case, the mobile IAB node can receive the first TAC list when the node moves into signal coverage of the network node.

S104: Initiate a TAU procedure based on the first TAC list information in a case that a new tracking area identity (Tracking Area Identity, TAI) is discovered.

The TAU procedure initiated by the mobile IAB node is used by a first access and mobility management function (Access and Mobility Management Function, AMF) to update location information of a terminal device. The terminal device mentioned here may be a terminal device that resides in a cell provided by the mobile IAB node. The terminal device moves along with the mobile IAB node.

In this embodiment, terminal devices reside in the cell provided by the mobile IAB node, and the mobile IAB node can provide access and backhaul services for the terminal devices. In subsequent embodiments, an AMF to which the terminal device is homed may be referred to as a first AMF, and an AMF to which the mobile IAB node is homed may be referred to as a second AMF. The first AMF may be the same as or different from the second AMF.

It is hereby noted that, if the AMF mentioned in an embodiment hereof is not preceded by "first" or "second", the AMF is, by default, an AMF to which both the terminal device and the mobile IAB node are homed. That is, the AMF to which the terminal device is homed is the same as the AMF to which the mobile IAB node is homed.

If an AMF mentioned in an embodiment hereof is preceded by "first" or "second", then, in some embodiments, the AMF to which the terminal device is homed is different from the AMF to which the mobile IAB node is homed. However, in another embodiment, in a case that the AMF to which the terminal device is homed is the same as the AMF to which the mobile IAB node is homed, the AMF may still be preceded by "first" or "second" for correspondence of context.

Before this embodiment, the AMF (for example, the second AMF) to which the mobile IAB node is homed may configure TAI list information (hereinafter briefly referred to as TAI list) for the mobile IAB node. In this embodiment, the mobile IAB node may integrate the Public Land Mobile Network (Public Land Mobile Network, PLMN) of the cell with the first TAC list to form a TAI. If a TAI is not in the TAI list configured by the mobile IAB node, the TAI may be referred to as a new TAI discovered, and the mobile IAB node may initiate a TAU procedure, and report location update of the mobile IAB node to the AMF (for example, the second AMF).

It is hereby noted that because TAI is in one-to-one correspondence with TAC, the embodiments hereof do not strictly distinguish between TAI and TAC, and TAI described in some examples may be replaced by TAC. For example, discovering a new TAI mentioned in step S104 may be referred to as discovering a new TAC; and TAC described in other examples may be replaced by TAI.

Optionally, in a case that the first AMF is the same as the second AMF, the AMF to which both the mobile IAB node and the terminal device are homed can update the location information of the mobile IAB node (that is, the TAI list of the mobile IAB node) through the TAU procedure. For example, the AMF may add the new TAI reported by the mobile IAB node into the TAI list of the mobile IAB node and allocate the new TAI to the mobile IAB node. Through the TAU procedure, the AMF can track the location information of the mobile IAB node, and can track the location information of the terminal device in the cell provided by the mobile IAB node.

Optionally, in a case that the first AMF is different from the second AMF, the mobile IAB node initiates a TAU procedure toward the second AMF. Through the TAU procedure, the second AMF can update the location information of the mobile IAB node (that is, the TAI list of the mobile IAB node). In addition, the second AMF can send the TAI list updated by the mobile IAB node to the first AMF. In this way, based on the TAI list of the mobile IAB node, the first AMF can track the location information of the terminal device in the cell provided by the mobile IAB node.

In this embodiment, the terminal device resides in the cell provided by the mobile IAB node. By virtue of high power and superior antenna performance, the IAB node can provide a huge relay bandwidth for the terminal device. In addition, the cell provided by the mobile IAB node moves along with the passenger's terminal device. The passenger's terminal device enjoys a good air interface channel without a need to hand over frequently, thereby greatly improving the running speed of the terminal device and avoiding service interruption caused by frequent handover between cells. Therefore, as far as this aspect is concerned, the terminal device that moves along with the mobile IAB node usually does not initiate a TAU procedure, thereby reducing the probability of TAU storms. On the other hand, even if the terminal device receives TAC lists such as the first TAC list, the terminal device may ignore the TAC lists without initiating a TAU procedure, thereby further avoiding a TAU storm.

The mobile IAB node in this embodiment of the present disclosure may be installed in a means of transport such as a train or bus. The terminal device served by the mobile IAB node moves along with the cell of the mobile IAB node. The mobile IAB node usually includes a distributed unit (Distributed Unit, DU) function part and a mobile termination (Mobile Termination, MT) function part.

In this embodiment of the present disclosure, a second TAC list may be configured for the mobile IAB node. A TA corresponding to the second TAC list is constructed from the cell provided by the mobile IAB node. The second TAC list may be broadcast by the mobile IAB node. The second TAC list corresponds to the MT of the mobile IAB node.

In a process of boarding the train or bus, the passenger carries the terminal device into the TA of the mobile IAB node, and then a TAU process (procedure) is triggered. Subsequently, the terminal device resides in the cell of the TA all along, and therefore, no more TAU processes are triggered.

The MT of the mobile IAB node may trigger a TAU process when entering a new TA. The MT of the mobile IAB node reports a new TAI in the TAU process. By means of the TAU procedure of the MT, the AMF tracks movement of the IAB cell of the mobile IAB node, and can track the location information of the terminal device in the cell provided by the mobile IAB node.

In the TAU method based on a mobile IAB node according to this embodiment of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

In the embodiments of the present disclosure, the TAU procedure is initiated by the mobile IAB node instead of the terminal device, thereby not only solving the problem that the terminal device is prone to cause a TAU storm, but also avoiding power consumption caused by frequent initiation of the TAU procedure by the terminal device.

Optionally, before the method 100, the following steps may be included: sending, by the mobile IAB node, indication information to a donor IAB node and/or a second AMF. The indication information is used for indicating that the mobile IAB node is a mobile node in type. The second AMF is an AMF to which the mobile IAB node is homed, and alternatively, may be an AMF to which both the mobile IAB node and the terminal device are homed.

As mentioned above, a second TAC list may be configured for the mobile IAB node. The second TAC list may be broadcast by the mobile IAB node. Optionally, in an example, the donor IAB node that establishes a backhaul link to the mobile IAB node may configure the second TAC list for the mobile IAB node. In this way, the method 100 may further include the following steps: receiving, by the mobile IAB node, the TAC configuration information from the donor IAB node. The TAC configuration information is used for configuring the second TAC list for the mobile IAB node. The second TAC list is used for being broadcast by the mobile IAB node. In this way, after receiving the TAC configuration information, the mobile IAB node can undergo configuration based on the TAC configuration information.

As mentioned above, in this embodiment hereof, the AMF to which the terminal device is homed is referred to as a first AMF, and the AMF to which the mobile IAB node is homed is referred to as a second AMF. The first AMF may be the same as or different from the second AMF.

Optionally, in a case that the first AMF is different from the second AMF:
1) After undergoing configuration based on the TAC configuration information, the mobile IAB node may further send the second TAC list to the second AMF. Alternatively, the mobile IAB node may send the second TAC list in a process of registering at the second AMF. The second AMF may establish an association between the mobile IAB node and the second TAC list. Further, the second AMF may send the second TAC list to the first AMF. The first AMF may further establish an association between the mobile IAB node and the second TAC list.
2) If the mobile IAB node does not send the second TAC list in the process of registering at the second AMF, or if the second TAC list of the mobile IAB node is reconfigured, then the mobile IAB node may report the second TAC list in the process of initiating the TAU procedure toward the second AMF.

In this way, the initiating the TAU procedure in a case that a new TAI is discovered, as mentioned in step S104 of the method 100, includes: sending TAU request information to the second AMF in a case that the new TAI is discovered, where the TAU request information includes the new TAI and the second TAC list. The new TAI is used by the second AMF to configure an updated TAI list for the mobile IAB node. The second TAC list is used by the first AMF to establish an association between the new TAI and the second TAC list. The second AMF may further send the second TAC list to the first AMF.

Optionally, in a case that the first AMF is the same as the second AMF:
1) After undergoing configuration based on the TAC configuration information, the mobile IAB node may further send the second TAC list to the AMF. Alternatively, the mobile IAB node may send the second TAC list in a process of registering at the AMF. The AMF may establish an association between the mobile IAB node and the second TAC list.
2) If the mobile IAB node does not send the second TAC list in the process of registering at the AMF, or if the second TAC list of the mobile IAB node is reconfigured, then the mobile IAB node may report the second TAC list to the AMF in the process of initiating the TAU procedure toward the AMF.

In this way, the initiating the TAU procedure in a case that a new TAI is discovered, as mentioned in step S104 of the method 100, includes: sending TAU request information to the AMF in a case that the new TAI is discovered, where the TAU request information includes the new TAI and the second TAC list. The new TAI is used by the AMF to configure an updated TAI list for the mobile IAB node. The second TAC list is used by the AMF to establish an association between the new TAI and the second TAC list.

Optionally, after undergoing configuration based on the TAC configuration information, the mobile IAB node may further send the second TAC list to the donor IAB node. The second TAC list is used for being broadcast by the mobile IAB node.

The location of the mobile IAB node is usually not fixed. Therefore, the number of donor IAB nodes that establish a backhaul link to the mobile IAB node is not limited to 1. For example, a source donor IAB node may configure the second TAC list for the mobile IAB node. In this way, after disconnecting the backhaul link from the source donor IAB node during movement, the mobile IAB node may send the second TAC list to a target donor IAB node after establishing a backhaul link to a next donor IAB node (for ease of identifying, hereinafter referred to as a target donor IAB node).

In this case, the target donor IAB node usually does not reconfigure the second TAC list of the mobile IAB node. Understandably, in other embodiments, the target donor IAB node may further reconfigure the second TAC list of the mobile IAB node. In this way, the mobile IAB node does not need to report the previously configured second TAC list to the target donor IAB node.

Optionally, after receiving the second TAC list from the mobile IAB node, the target donor IAB node may further report the second TAC list to a second AMF. The second AMF may be an AMF to which the mobile IAB node is homed, and alternatively, may be an AMF to which both the mobile IAB node and the terminal device are homed.

Optionally, after receiving the second TAC list from the mobile IAB node, the target donor IAB node may further add the second TAC list into the first TAC list. The first TAC list is the TAC list broadcast by the target donor IAB node.

In this embodiment, the terminal device carried by the passenger who gets off a vehicle from the cell provided by the target donor IAB node will no longer discover a new TAI, and therefore, will not initiate a TAU procedure, thereby further avoiding the problem of TAU storms.

Optionally, in some other embodiments, the target donor IAB node may further actively send request information to the mobile IAB node. The request information is used for requesting the second TAC list of the mobile IAB node. The second TAC list is used for being broadcast by the mobile IAB node. In this way, the mobile IAB node can send the second TAC list to the target donor IAB node after receiving the request information.

Optionally, the target donor IAB node may further send RRC configuration information to the mobile IAB node. The RRC configuration information is used by the mobile IAB node to add the first TAC list into the second TAC list. In this way, after receiving the RRC configuration information, the mobile IAB node may add the first TAC list into the second TAC list. The second TAC list is broadcast by the mobile IAB node. The first TAC list is broadcast by the target donor IAB node.

In the above embodiment, the target donor IAB node proactively sends the RRC configuration information to the mobile IAB node. Optionally, in another implementation, the mobile IAB node may further send request information to the target donor IAB node to request the first TAC list. In this way, the target donor IAB node can send the first TAC list to the mobile IAB node after receiving the request information. The mobile IAB node can add the first TAC list into the second TAC list after receiving the first TAC list.

The second TAC list is broadcast by the mobile IAB node. The first TAC list is broadcast by the target donor IAB node.

In the method 100, the initiating, by the mobile IAB node, a TAU procedure may further include: receiving, by the mobile IAB node, TAI configuration information, where the TAI configuration information is used for configuring an updated TAI list for the mobile IAB node; and performing configuration for the mobile IAB node based on the TAI configuration information.

After receiving the TAI configuration information, the mobile IAB node may further receive a paging request from the donor IAB node, and send a paging message specific to the target terminal device based on the paging request. The target terminal device may be any terminal device served by the mobile IAB node. The paging request is sent, based on the TAI list of the mobile IAB node, to the donor IAB node by the AMF to which the terminal device is homed (alternatively, the AMF may be the AMF to which both the mobile IAB node and the terminal device are homed).

In an example, the paging request includes an indication message. The indication message is used for indicating the mobile IAB node. In this way, the donor IAB node may send the paging request to the mobile IAB node alone.

In another example, the donor IAB node may configure cells corresponding to the first TAC list (such cells may include the cell provided by the mobile IAB node) and IAB cells controlled by the donor IAB node (such cells may include the cell provided by the mobile IAB node) so as to send a paging message specific to the target terminal device. The first TAC list is broadcast by the donor IAB node.

To describe in detail the TAU method based on a mobile IAB node according to the above embodiments of the present disclosure, the following describes the method with reference to a specific embodiment.

Figure 2:
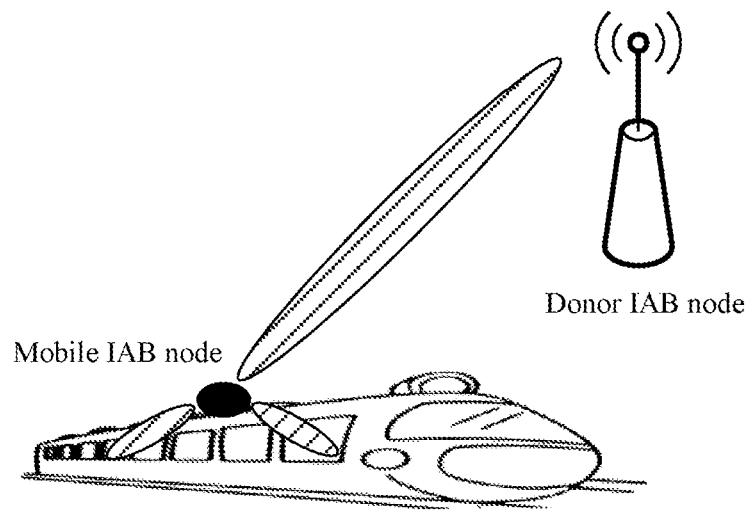
FIG. 2 is a schematic diagram of a mobile IAB system for implementing a TAU method based on a mobile IAB node according to an embodiment of the present disclosure.

As shown in FIG. 2, FIG. 2 is a schematic diagram of a mobile IAB system including a mobile IAB node and a donor IAB node. The donor IAB node is directly connected to a wired transport network. The mobile IAB node is connected to the donor IAB node through a wireless backhaul link. The mobile IAB node may be installed in a means of transport such as a train.

Figure 3:
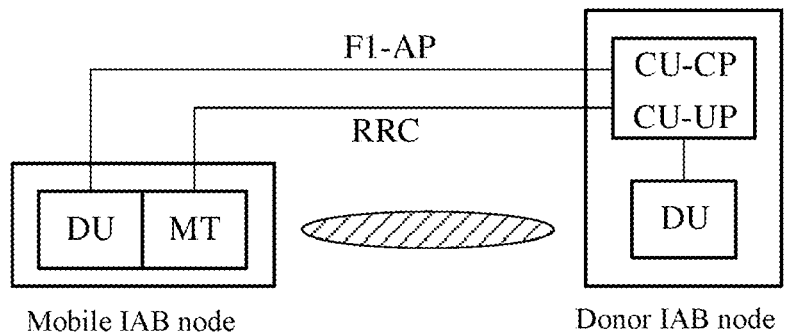
FIG. 3 is a schematic structural diagram of a mobile IAB node and a donor IAB node according to an embodiment of the present disclosure.

As shown in FIG. 3, FIG. 3 is a schematic structural diagram of a mobile IAB node and a donor IAB node. After a backhaul link is established between the mobile IAB node and the donor IAB node. Each DU of the mobile IAB node is connected to a centralized unit (Centralized Unit, CU) of the donor IAB node. The CU configures the DU by using an F1-interface control-plane signaling message protocol (F1 Application Protocol, F1-AP). The CU configures the MT by using an RRC protocol. The donor IAB node includes no MT function part.

By virtue of the MT, the mobile IAB node can find an upstream access point such as the donor IAB node, and establish a wireless connection to the DU of the donor IAB node. The wireless connection is referred to as a backhaul link. After the mobile IAB node establishes a complete backhaul link, the mobile IAB node enables a DU function. The DU provides cell services. That is, the DU can provide access services for the terminal device.

Figure 4:
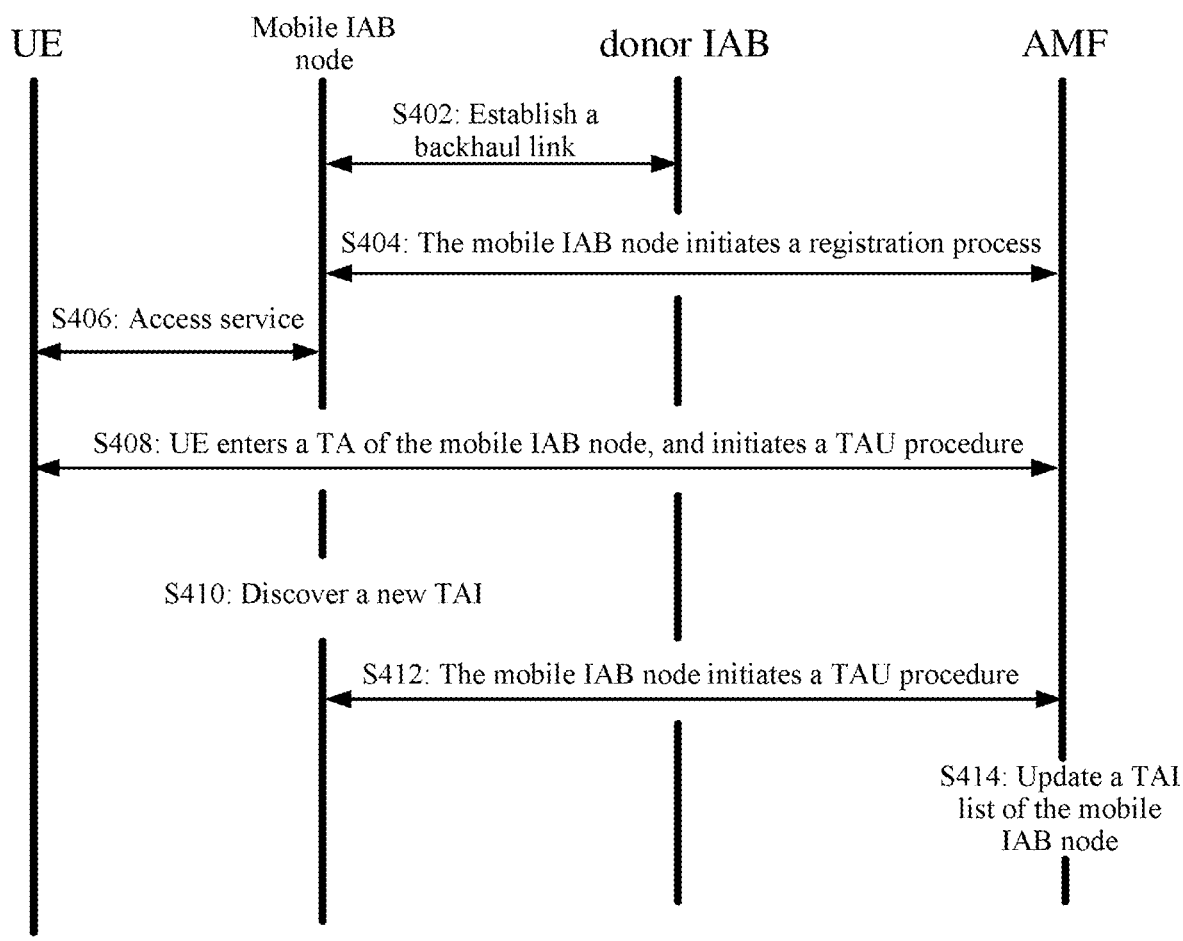
FIG. 4 is a schematic flowchart of a TAU method based on a mobile IAB node according to another embodiment of the present disclosure.

As shown in FIG. 4, FIG. 4 is a schematic flowchart of a TAU method based on a mobile IAB node. The method 400 includes the following steps:

S402: A mobile IAB node establishes a backhaul link to a donor IAB node.

S404: The mobile IAB node initiates a registration process toward an AMF, during which the AMF may configure a TAI list for the mobile IAB node.

S406: The mobile IAB node provides an access service for UE.

S408: The UE enters a TA area of the mobile IAB node, and initiates a TAU procedure toward the AMF.

S410: The mobile IAB node discovers a new TAI.

S412: The mobile IAB node initiates a TAU procedure.

For detailed processes of steps S410 and S412, reference may be made to the description of the method 100.

S414: The AMF updates the TAI list of the mobile IAB node.

As mentioned in the preceding embodiment hereof, the AMF to which the terminal device served by the mobile IAB node is homed is referred to as a first AMF, and the AMF to which the mobile IAB node is homed is referred to as a second AMF. The first AMF may be the same as or different from the second AMF.

In the embodiment shown in FIG. 4, the AMF to which the terminal device is homed is the same as the AMF to which the mobile IAB node is homed.

Figure 5:
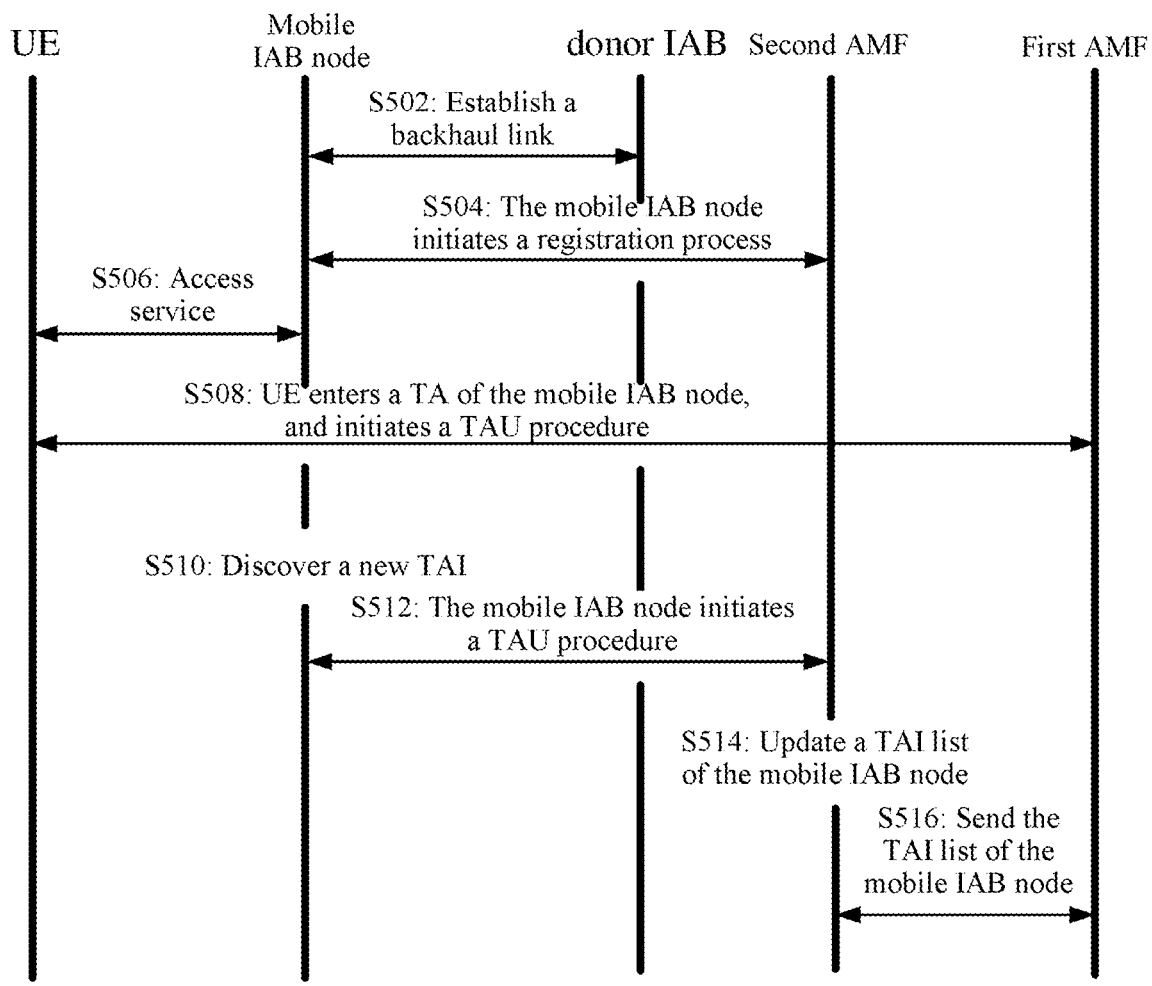
FIG. 5 is a schematic flowchart of a TAU method based on a mobile IAB node according to still another embodiment of the present disclosure.

As shown in FIG. 5, FIG. 5 is a schematic flowchart of a TAU method based on a mobile IAB node. In this embodiment, the AMF to which the terminal device is homed is different from the AMF to which the mobile IAB node is homed. The AMF to which the terminal device is homed is referred to as a first AMF, and the AMF to which the mobile IAB node is homed is referred to as a second AMF. The method 500 includes the following steps:

S502: A mobile IAB node establishes a backhaul link to a donor IAB node.

S504: The mobile IAB node initiates a registration process toward a second AMF, during which the second AMF may configure a TAI list for the mobile IAB node.

S506: The mobile IAB node provides an access service for UE.

S508: The UE enters a TA area of the mobile IAB node, and initiates a TAU procedure toward a first AMF.

S510: The mobile IAB node discovers a new TAI.

S512: The mobile IAB node initiates a TAU procedure toward the second AMF.

For detailed processes of steps S510 and S512, reference may be made to the description of the method 100.

S514: The second AMF updates the TAI list of the mobile IAB node.

S516: The second AMF sends the TAI list updated by the mobile IAB node to the first AMF.

Alternatively, the second AMF may send an update message to the first AMF through an interface between the AMFs. The update message carries TAI location information of the mobile IAB node (the TAI location information may be an IP address of a CU). The TAI location may be identified by a TAC in the TAC list broadcast by a serving cell (for example, a cell provided by the donor IAB node) of the mobile IAB node.

After receiving the update message, the first AMF may send a paging message to the terminal device based on the TAI list.

Optionally, in the method 400 and the method 500, the registration or access process of the mobile IAB node includes the following features:

1) The mobile IAB node needs to send a report to the AMF (the AMF in FIG. 4, or the second AMF in FIG. 5), indicating that the node is a mobile IAB node. The report may be sent by the mobile IAB node to the CU of the donor IAB node when the mobile IAB node is connected to the donor IAB node, and then sent by the CU to the AMF. Alternatively, the report may be sent by the mobile IAB node to the AMF (the AMF in FIG. 4, or the second AMF in FIG. 5) directly through MT signaling.

2) When connected to a new donor IAB node, the mobile IAB node may send a report to the CU of the donor IAB node, indicating that the node is a mobile IAB node.

3) After establishing an F1 connection to the CU of the donor IAB node, the DU of the mobile IAB node obtains TAC configuration information of a mobile IAB cell from the CU. The TAC is used to configure the second TAC list. The second TAC list is broadcast by the mobile IAB node.

4) The MT of the mobile IAB node reports the second TAC list to the AMF (the AMF in FIG. 4, or the second AMF in FIG. 5). The AMF records a correspondence between the MT of the mobile IAB node and the second TAC list.

Optionally, the second AMF may further send the second TAC list to the first AMF. The first AMF may record the correspondence between the MT of the mobile IAB node and the second TAC list.

Optionally, in the method 400 and the method 500, the TAU process of the mobile IAB node includes the following features:

If the mobile IAB node does not report the second TAC list to the AMF or the second TAC list is reconfigured during registering at the AMF, the report sent by the mobile IAB node may carry the second TAC list in addition to the new TAI discovered (the TAI that is not included in the TAI list).

The AMF (the AMF in FIG. 4, or the first AMF in FIG. 5) records a mapping relationship between the new TAI of the mobile IAB node and the second TAC list, and updates the TAI list of the MT of the mobile IAB node.

Optionally, in the method 400 and the method 500, the AMF (the AMF in FIG. 4, or the first AMF in FIG. 5) initiates, by at least the following two methods, paging toward the terminal device that resides in the cell of the mobile IAB node:

Paging method I: The AMF (the AMF in FIG. 4, or the first AMF in FIG. 5) sends a paging request to the CU node of each cell included in the TAI list of the MT of the mobile IAB node, where the paging request is specific to the UE served by the cell of the mobile IAB node. The paging request may explicitly or implicitly indicate an IAB TAI in which the UE resides.

After a CU node receives the paging request, if determining that the received IAB TAI corresponds to the cell provided by the mobile IAB node controlled by the CU node, the CU node configures the cell of the mobile IAB node so that a paging message is sent in response to the paging request. If determining that the IAB TAI does not correspond to the cell provided by the mobile IAB node controlled by the CU node, the CU node just ignores the paging request.

Paging method II: The AMF (the AMF in FIG. 4, or the first AMF in FIG. 5) sends a paging request to the CU node of each cell included in the TAI list of the MT of the mobile IAB node, where the paging request is specific to the UE served by the cell of the mobile IAB node. Each CU node configures each cell in the TAI list and all IAB cells controlled by the CU node so that each of the cells sends a paging message.

In all the embodiments described above, the mobile IAB node may further report the second TAC list to the AMF, that is, report the TAC list broadcast by the mobile IAB node. The following gives a detailed description with reference to two specific embodiments.

Figure 6:
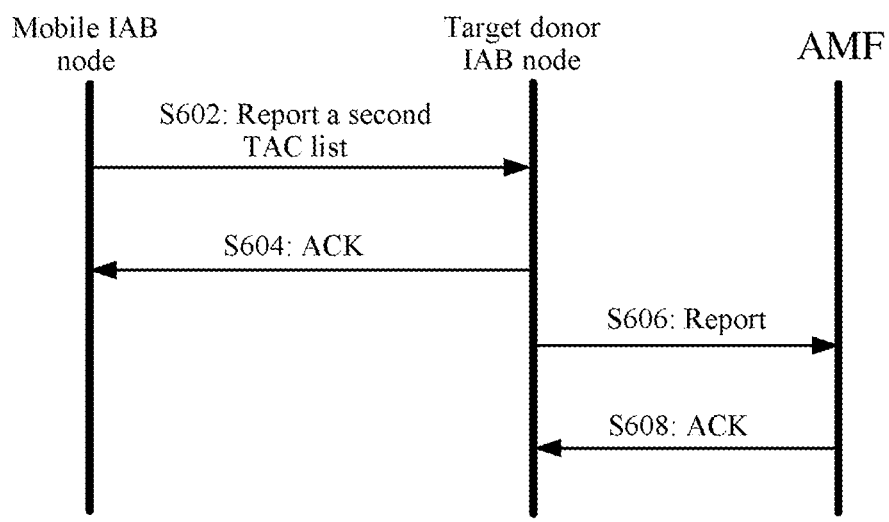
FIG. 6 is a partial flowchart of a TAU method based on a mobile IAB node according to an embodiment of the present disclosure.

As shown in FIG. 6, the method in the embodiment shown in FIG. 6 includes the following steps:

S602: During or after connecting by a mobile IAB node to a new donor IAB node (for convenience of identifying, hereinafter referred to as target donor IAB node), the mobile IAB node sends a report message to the target donor IAB node, where the report message carries a TAC list broadcast through an air interface of the mobile IAB node, that is, the second TAC list described in the preceding embodiment.

The report message may be an RRC message or an F1-AP message.

Optionally, the mobile IAB node may further report information on a supported PLMN list and a supported slice.

S604: The target donor IAB node feeds back an ACK message. The ACK message may occur before step S606 or after step S608, or at other times, without being limited in this embodiment hereof.

S606: If the target donor IAB node determines that at least one TAC in the second TAC list reported by the mobile IAB node is not included in the previously reported TAC list, the target donor IAB node initiates a reporting process (such as a RAN configuration update process). In the reporting process, the target donor IAB node sends a message to the AMF. The message carries at least a target TAC in the second TAC list, and the target TAC is not included in the TAC list previously reported to the AMF.

S608: The AMF sends an ACK feedback message to the target donor IAB node.

The AMF mentioned in this embodiment may be any AMF that is connected to the target donor IAB node and that provides services for the terminal device.

Optionally, after the target donor IAB node receives the second TAC list, if a TAC in the second TAC list is not included in the first TAC list (the first TAC list is broadcast by the target donor IAB node), then the target donor IAB node adds the TAC into the first TAC list.

In this embodiment, the terminal device carried by the passenger who gets off a vehicle from the cell provided by the target donor IAB node will no longer discover a new TAI, and therefore, will not initiate a TAU procedure, thereby further avoiding the problem of TAU storms.

Optionally, a source donor IAB node of the mobile IAB node may further remove, from a TAI list thereof, the TAI of the mobile IAB node that has been handed over to another TAC area.

Optionally, the target donor IAB node may further send RRC configuration information to the mobile IAB node. The RRC configuration information is used by the mobile IAB node to add the first TAC list into the second TAC list. In this way, after receiving the RRC configuration information, the mobile IAB node may add the first TAC list into the second TAC list. The second TAC list is broadcast by the mobile IAB node. The first TAC list is broadcast by the target donor IAB node. Correspondingly, the mobile IAB node removes the first TAC list of the source donor IAB node from the second TAC list.

Optionally, after the handover succeeds, the mobile IAB node obtains the first TAI list of the target donor IAB node from an IAB-MT, and adds the first TAI list into the second TAC list.

Figure 7:
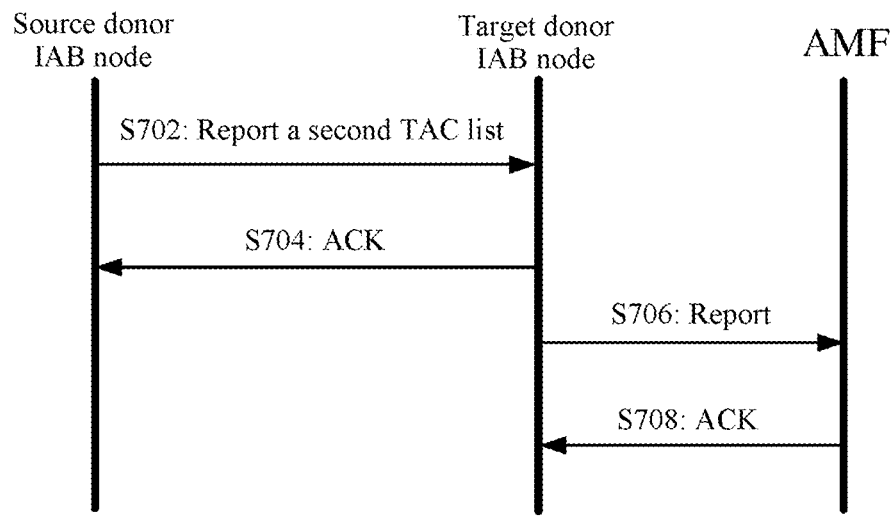
FIG. 7 is a partial flowchart of a TAU method based on a mobile IAB node according to another embodiment of the present disclosure.

As shown in FIG. 7, the method in the embodiment shown in FIG. 7 includes the following steps:

S702: A source donor IAB node of a mobile IAB node sends a message to a target donor IAB node. The message carries a second TAC list (that is, a TAC list broadcast through an air interface of the mobile IAB node). The message may be HandoverPreparationInformation (HandoverPreparationInformation) of the mobile IAB node.

S704: The target donor IAB node feeds back an ACK message to the source donor IAB node.

The ACK message may occur before step S706 or after step S708 or at other times. Optionally, the ACK message occurs before step S706. The ACK message may be HandoverCommandMessage (HandoverCommandMessage).

S706: If the target donor IAB node determines that at least one TAC in the second TAC list sent by the source donor IAB node is not included in the previously reported TAC list, the target donor IAB node initiates a reporting process (such as a RAN configuration update process). In this process, the target donor IAB sends a message to the AMF. The message carries at least a target TAC in the second TAC list, and the target TAC is not included in the TAC list previously reported to the AMF.

S708: The AMF sends an ACK feedback message to the target donor IAB node.

Optionally, step S706 occurs after the mobile IAB node completes the handover to the target donor IAB node, that is, occurs after the donor IAB node receives, through the air interface, a handover/RRC reconfiguration completion message sent by the mobile IAB node.

Optionally, after the target donor IAB node receives the second TAC list, if a TAC in the second TAC list is not included in the first TAC list (the first TAC list is broadcast by the target donor IAB node), then the target donor IAB node adds the TAC into the first TAC list.

In this embodiment, the terminal device carried by the passenger who gets off a vehicle from the cell provided by the target donor IAB node will no longer discover a new TAI, and therefore, will not initiate a TAU procedure, thereby further avoiding the problem of TAU storms.

Optionally, a source donor IAB node of the mobile IAB node may further remove, from a TAI list thereof, the TAI of the mobile IAB node that has been handed over to another TAC area.

Optionally, the target donor IAB node may further generate an RRC message. The message may be packaged into a HandoverCommandMessage (HandoverCommandMessage). Alternatively, after the mobile IAB node completes handover, the target donor IAB node sends an RRC message to the mobile IAB node to perform configuration. Through the configuration, the mobile IAB node adds the TACs in the first TAC list of the target donor IAB node into the second TAI list of the mobile IAB node. Correspondingly, the mobile IAB node removes the first TAC list of the source donor IAB node from the second TAC list.

Optionally, after the handover succeeds, the mobile IAB node obtains the first TAI list of the target donor IAB node from an IAB-MT, and adds the first TAI list into the second TAC list.

What is detailed above is the TAU method based on a mobile IAB node according to embodiments of the present disclosure with reference to FIG. 1 to FIG. 7. The following describes in detail a TAU method based on a mobile IAB node according to another embodiment of the present disclosure with reference to FIG. 8. Understandably, the interaction described from the donor IAB node side is the same as what is described from the mobile IAB node side in the method shown in FIG. 1, and related descriptions are duly omitted for brevity.

FIG. 8 is a schematic flowchart of implementing a TAU method based on a mobile IAB node according to an embodiment of the present disclosure. The method is applicable to a donor IAB node side. As shown in FIG. 8, the method 800 includes the following steps:

S802: Send first TAC list information. The first TAC list information is used by a mobile IAB node to initiate a TAU procedure in a case that a new TAI is discovered. The TAU procedure is used by a first AMF to update location information of a terminal device. The terminal device resides in a cell provided by the mobile IAB node.

In the TAU method based on a mobile IAB node according to this embodiment of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

In the embodiments of the present disclosure, the TAU procedure is initiated by the mobile IAB node instead of the terminal device, thereby not only solving the problem that the terminal device is prone to cause a TAU storm, but also avoiding power consumption caused by frequent initiation of the TAU procedure by the terminal device.

Optionally, in an embodiment, the method 800 further includes:
receiving indication information.
The indication information is used for indicating that the mobile IAB node is a mobile node in type.

Optionally, in an embodiment, the method 800 further includes:
sending TAC configuration information.
The TAC configuration information is used by the mobile IAB node to configure second TAC list information. The second TAC list information is used for being broadcast by the mobile IAB node.

Optionally, in an embodiment, the method 800 further includes:
receiving second TAC list information, where the second TAC list information is used for being broadcast by the mobile IAB node;
initiating a reporting process to a second AMF based on the second TAC list information, where the second AMF is an AMF to which the mobile IAB node is homed; and/or
adding the second TAC list information into the first TAC list information that is broadcast by the donor IAB node.

Optionally, in an embodiment, the second TAC list information is:
sent by the mobile IAB node; or
sent by a source donor IAB node of the mobile IAB node.

Optionally, in an embodiment, the method 800 further includes:
sending request information, where the request information is used for requesting second TAC list information, and the second TAC list information is used for being broadcast by the mobile IAB node; and
receiving the second TAC list information.

Optionally, in an embodiment, the method 800 further includes:
sending RRC configuration information, where the RRC configuration information is used by the mobile IAB node to add the first TAC list information into second TAC list information, and the second TAC list information is used for being broadcast by the mobile IAB node.

Optionally, in an embodiment, the first TAC list information is used by the mobile IAB node to add the first TAC list information into second TAC list information. The second TAC list information is used for being broadcast by the mobile IAB node.

Optionally, in an embodiment, the method 800 further includes:

receiving a paging request from the first AMF, where the paging request is sent by the first AMF based on TAI list information updated by the mobile IAB node, the paging request includes an indication message, and the indication message is used for indicating the mobile IAB node; and sending the paging request to the mobile IAB node, where the paging request is used as a basis for the mobile IAB node to send a paging message specific to a target terminal device.

Optionally, in an embodiment, the method 800 further includes:

receiving a paging request from the first AMF, where the paging request is sent by the first AMF based on TAI list information updated by the mobile IAB node; and configuring each cell corresponding to the first TAC list information and an IAB cell controlled by the donor IAB node so that such cells send a paging message specific to a target terminal device.

FIG. 9 is a schematic flowchart of implementing a TAU method based on a mobile IAB node according to an embodiment of the present disclosure. The method is applicable to a first AMF side. As shown in FIG. 9, the method 900 includes the following steps:

S902: Update location information of a terminal device in a case that the mobile IAB node initiates a TAU procedure.

The terminal device resides in a cell provided by the mobile IAB node. The TAU procedure is initiated by the mobile IAB node based on received first TAC list information in a case that a new TAI is discovered.

In the TAU method based on a mobile IAB node according to this embodiment of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

In the embodiments of the present disclosure, the TAU procedure is initiated by the mobile IAB node instead of the terminal device, thereby not only solving the problem that the terminal device is prone to cause a TAU storm, but also avoiding power consumption caused by frequent initiation of the TAU procedure by the terminal device.

Optionally, in an embodiment, the updating location information of a terminal device in a case that the mobile IAB node initiates a TAU procedure further includes:

receiving TAI list information coming from a second AMF and updated by the mobile IAB node, where the second AMF is an AMF to which the mobile IAB node is homed.

Optionally, in an embodiment, the method 900 further includes:

receiving second TAC list information reported by a donor IAB node, where the second TAC list information is used for being broadcast by the mobile IAB node.

The second TAC list information is:
sent by the mobile IAB node to the donor IAB node; or
sent by a source donor IAB node of the mobile IAB node to the donor IAB node.

Optionally, in an embodiment, the method 900 further includes:

sending a paging request to a donor IAB node based on the TAI list information, where the paging request is used as a basis for the donor IAB node to send a paging message specific to a target terminal device.

Optionally, in an embodiment, the paging request includes an indication message. The indication message is used for indicating the mobile IAB node.

The donor IAB node sends the paging request to the mobile IAB node alone.

Optionally, in an embodiment, the method 900 further includes:

receiving second TAC list information from a second AMF, where the second AMF is an AMF to which the mobile IAB node is homed, and the second TAC list information is used for being broadcast by the mobile IAB node; and establishing an association between the mobile IAB node and the second TAC list information.

What is detailed above is the TAU method based on a mobile IAB node according to embodiments of the present disclosure with reference to FIG. 1 to FIG. 9. The following describes a network device in detail according to embodiment of the present disclosure with reference to FIG. 10.

FIG. 10 is a schematic structural diagram of a network device according to an embodiment of the present disclosure. The network device corresponds to the mobile IAB node described above. As shown in FIG. 10, the network device 1000 includes:

a receiving module 1002, configured to receive first tracking area code (TAC) list information; and a sending module 1004, configured to initiate a tracking area update (TAU) procedure based on the first TAC list information in a case that a new tracking area identity (TAI) is discovered.

The TAU procedure is used by a first access and mobility management function (AMF) to update location information of a terminal device, and the terminal device resides in a cell provided by the mobile IAB node.

By using the network device according to this embodiment of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

In the embodiments of the present disclosure, the TAU procedure is initiated by the mobile IAB node instead of the terminal device, thereby not only solving the problem that the terminal device is prone to cause a TAU storm, but also avoiding power consumption caused by frequent initiation of the TAU procedure by the terminal device.

Optionally, in an embodiment, the sending module 1004 may be further configured to:

send indication information to a donor IAB node and/or a second AMF.

The indication information is used for indicating that the mobile IAB node is a mobile node in type. The second AMF is an AMF to which the mobile IAB node is homed.

Optionally, in an embodiment, the receiving module 1002 may be further configured to:

receive TAC configuration information from a donor IAB node, where the TAC configuration information is used for configuring second TAC list information, and the second TAC list information is used for being broadcast by the mobile IAB node; and perform configuration based on the TAC configuration information.

Optionally, in an embodiment, the sending module 1004 may be further configured to:

send the second TAC list information to a second AMF.

The second TAC list information is used by the first AMF to establish an association between the mobile IAB node and the second TAC list information. The second AMF is an AMF to which the mobile IAB node is homed. The second AMF is further configured to send the second TAC list information to the first AMF.

Optionally, in an embodiment, the sending module 1004 may be configured to:

send TAU request information to a second AMF in a case that the new TAI is discovered, where the TAU request information includes the new TAI and the second TAC list information.

The new TAI is used by the second AMF to configure updated TAI list information for the mobile IAB node. The second TAC list information is used by the first AMF to establish an association between the new TAI and the second TAC list information. The second AMF is an AMF to which the mobile IAB node is homed. The second AMF is further configured to send the second TAC list information to the first AMF.

Optionally, in an embodiment, the sending module 1004 may be further configured to:

send second TAC list information to a donor IAB node, where the second TAC list information is used for being broadcast by the mobile IAB node.

The second TAC list information is further used for:

being reported by the donor IAB node to a second AMF, where the second AMF is an AMF to which the mobile IAB node is homed; and/or being added by the donor IAB node into the first TAC list information that is broadcast by the donor IAB node.

Optionally, in an embodiment, the receiving module 1002 may be further configured to receive request information from a donor IAB node. The request information is used for requesting second TAC list information. The second TAC list information is used for being broadcast by the mobile IAB node. The sending module 1004 may be further configured to send the second TAC list information to the donor IAB node.

Optionally, in an embodiment, the receiving module 1002 may be further configured to:

receive RRC configuration information, where the RRC configuration information is used by the mobile IAB node to add the first TAC list information into second TAC list information; and add the first TAC list information into second TAC list information, where the second TAC list information is used for being broadcast by the mobile IAB node.

Optionally, in an embodiment, the receiving module 1002 may be further configured to:

receive first TAC list information; and add the first TAC list information into second TAC list information, where the second TAC list information is used for being broadcast by the mobile IAB node.

Optionally, in an embodiment, the receiving module 1002 may be further configured to:

receive TAI configuration information, where the TAI configuration information is used for configuring updated TAI list information for the mobile IAB node; and perform configuration based on the TAI configuration information.

Optionally, in an embodiment, the receiving module 1002 may be further configured to:

receive a paging request from a donor IAB node, and send a paging message specific to a target terminal device based on the paging request.

The paging request is sent by the first AMF to the donor IAB node based on the TAI list information.

Optionally, in an embodiment, the paging request includes an indication message. The indication message is used for indicating the mobile IAB node.

The donor IAB node sends the paging request to the mobile IAB node alone.

Details of the network device 1000 according to this embodiment of the present disclosure may be learned by referring to the processes of the corresponding methods 100 to 700 according to the embodiments of the present disclosure. Units/modules in the network device 1000 and other operations and/or functions of the network device are intended to implement the corresponding processes of the methods 100 to 700 separately, and can achieve the same or equivalent technical effects, and are omitted herein for brevity.

FIG. 11 is a schematic structural diagram of a network device according to an embodiment of the present disclosure. The network device corresponds to the donor IAB node described above. As shown in FIG. 11, the network device 1100 includes:

a sending module 1102, configured to send first TAC list information.

The first TAC list information is used by a mobile IAB node to initiate a TAU procedure in a case that a new TAI is discovered. The TAU procedure is used by a first AMF to update location information of a terminal device. The terminal device resides in a cell provided by the mobile IAB node.

By using the network device according to this embodiment of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

In the embodiments of the present disclosure, the TAU procedure is initiated by the mobile IAB node instead of the terminal device, thereby not only solving the problem that the terminal device is prone to cause a TAU storm, but also avoiding power consumption caused by frequent initiation of the TAU procedure by the terminal device.

Optionally, in an embodiment, the network device 1100 further includes a receiving module, configured to:

receive indication information.

The indication information is used for indicating that the mobile IAB node is a mobile node in type.

Optionally, in an embodiment, the sending module 1102 may be further configured to:

send TAC configuration information.

The TAC configuration information is used by the mobile IAB node to configure second TAC list information. The second TAC list information is used for being broadcast by the mobile IAB node.

Optionally, in an embodiment, the network device 1100 further includes a receiving module, configured to:

receive second TAC list information, where the second TAC list information is used for being broadcast by the mobile IAB node;

initiate a reporting process to a second AMF based on the second TAC list information, where the second AMF is an AMF to which the mobile IAB node is homed; and/or add the second TAC list information into the first TAC list information that is broadcast by the donor IAB node.

Optionally, in an embodiment, the second TAC list information is:

sent by the mobile IAB node; or sent by a source donor IAB node of the mobile IAB node.

Optionally, in an embodiment, the sending module 1102 may be further configured to:

send request information, where the request information is used for requesting second TAC list information, and the second TAC list information is used for being broadcast by the mobile IAB node; and receive the second TAC list information.

Optionally, in an embodiment, the sending module 1102 may be further configured to:

send RRC configuration information, where the RRC configuration information is used by the mobile IAB node to add the first TAC list information into second TAC list information, and the second TAC list information is used for being broadcast by the mobile IAB node.

Optionally, in an embodiment, the first TAC list information is used by the mobile IAB node to add the first TAC list information into second TAC list information. The second TAC list information is used for being broadcast by the mobile IAB node.

Optionally, in an embodiment, the network device 1100 further includes: a receiving module, configured to:

receive a paging request from the first AMF, where the paging request is sent by the first AMF based on TAI list information updated by the mobile IAB node, the paging request includes an indication message, and the indication message is used for indicating the mobile IAB node; and a sending module 1102, configured to send the paging request to the mobile IAB node, where the paging request is used as a basis for the mobile IAB node to send a paging message specific to a target terminal device.

Optionally, in an embodiment, the network device 1100 further includes: a receiving module, configured to:

receive a paging request from the first AMF, where the paging request is sent by the first AMF based on TAI list information updated by the mobile IAB node; and configure each cell corresponding to the first TAC list information and an IAB cell controlled by the donor IAB node so that such cells send a paging message specific to a target terminal device.

Details of the network device 1100 according to this embodiment of the present disclosure may be learned by referring to the processes of the corresponding method 800 according to the embodiments of the present disclosure. Units/modules in the network device 1100 and other operations and/or functions of the network device are intended to implement the corresponding processes of the method 800, and can achieve the same or equivalent technical effects, and are omitted herein for brevity.

Figure 12:
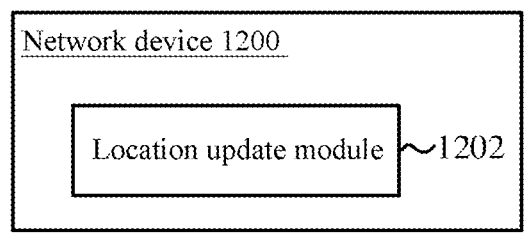
FIG. 12 is a schematic structural diagram of a network device according to still another embodiment of the present disclosure.

FIG. 12 is a schematic structural diagram of a network device according to an embodiment of the present disclosure. The network device corresponds to the first AMF described above. As shown in FIG. 12, the network device 1200 includes:

a location update module 1202, configured to update location information of a terminal device in a case that a mobile IAB node initiates a TAU procedure.

The terminal device resides in a cell provided by the mobile IAB node. The TAU procedure is initiated by the mobile IAB node based on received first TAC list information in a case that a new TAI is discovered.

By using the network device according to this embodiment of the present disclosure, the terminal device may reside in the cell provided by the mobile IAB node. The terminal device moves along with the mobile IAB node. In a case that a new TAI is discovered, the mobile IAB node initiates a TAU procedure. Through the TAU procedure, the AMF can track the location information of the terminal device.

In the embodiments of the present disclosure, the TAU procedure is initiated by the mobile IAB node instead of the terminal device, thereby not only solving the problem that the terminal device is prone to cause a TAU storm, but also avoiding power consumption caused by frequent initiation of the TAU procedure by the terminal device.

Optionally, in an embodiment, the location update module 1202 may be configured to:

receive TAI list information coming from a second AMF and updated by the mobile IAB node, where the second AMF is an AMF to which the mobile IAB node is homed.

Optionally, in an embodiment, the network device 1200 further includes: a receiving module, configured to:

receive second TAC list information reported by a donor IAB node, where the second TAC list information is used for being broadcast by the mobile IAB node.

The second TAC list information is:

sent by the mobile IAB node to the donor IAB node; or sent by a source donor IAB node of the mobile IAB node to the donor IAB node.

Optionally, in an embodiment, the network device 1200 further includes a sending module, configured to:

send a paging request to a donor IAB node based on the TAI list information, where the paging request is used as a basis for the donor IAB node to send a paging message specific to a target terminal device.

Optionally, in an embodiment, the paging request includes an indication message. The indication message is used for indicating the mobile IAB node.

The donor IAB node sends the paging request to the mobile IAB node alone.

Optionally, in an embodiment, the network device 1200 further includes: a receiving module, configured to:

receive second TAC list information from a second AMF, where the second AMF is an AMF to which the mobile IAB node is homed, and the second TAC list information is used for being broadcast by the mobile IAB node; and establish an association between the mobile IAB node and the second TAC list information.

Details of the network device 1200 according to this embodiment of the present disclosure may be learned by referring to the processes of the corresponding method 900 according to the embodiments of the present disclosure. Units/modules in the network device 1200 and other operations and/or functions of the network device are intended to implement the corresponding processes of the method 900, and can achieve the same or equivalent technical effects, and are omitted herein for brevity.

The embodiments hereof are described in a progressive manner, and each embodiment usually focuses on differences from other embodiments. For the same or similar content in one embodiment, reference may be made to another embodiment. A device embodiment is described briefly due to similarity to the method embodiment. Relevant details of the device embodiment may be learned by referring to the description of the corresponding part in the method embodiment.

Understandably, the embodiments described in the present disclosure may be implemented by hardware, software, firmware, middleware, microcode, or any combination thereof. For the implementation by hardware, the processing unit may be implemented in at least one application-specific integrated circuit (Application Specific Integrated Circuits, ASIC), digital signal processor (Digital Signal Processing, DSP), digital signal processing device (DSP Device, DSPD), programmable logic device (Programmable Logic Device, PLD), field-programmable gate array (Field-Programmable Gate Array, FPGA), general-purpose processor, controller, microcontroller, microprocessor, or other electronic unit for performing the functions described herein, or any combination thereof.

For the implementation by software, the technical solutions described in the embodiments of the present disclosure may be implemented by modules (such as processes and functions) that perform the functionalities of the embodiments of the present disclosure. Software code may be stored in a memory and executed by a processor. The memory may be implemented in the processor or outside the processor.

Figure 13:
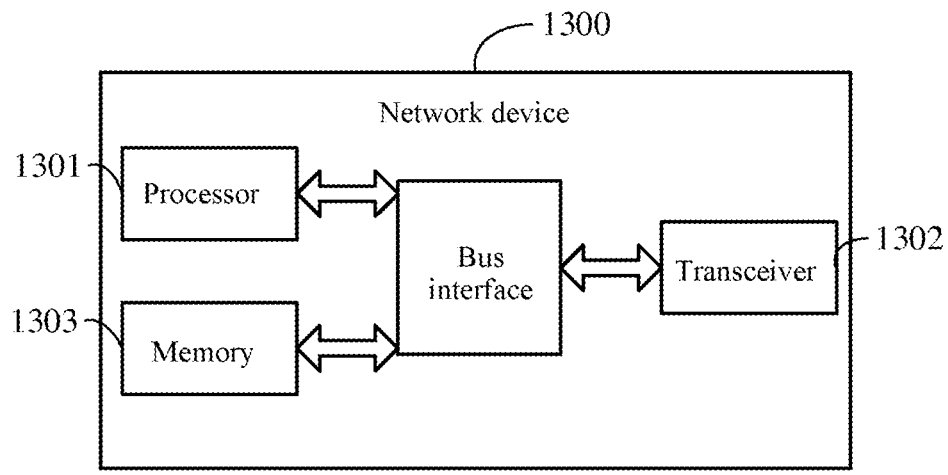
FIG. 13 is a schematic structural diagram of a network device according to yet another embodiment of the present disclosure.

Referring to FIG. 13, FIG. 13 is a structural diagram of a network device according to an embodiment of the present disclosure. The network device can implement the details of any one of the methods 100 to 900, and achieve the same effect as the method. As shown in FIG. 13, the network device 1300 includes: a processor 1301, a transceiver 1302, a memory 1303, and a bus interface.

In this embodiment of the present disclosure, the network device 1300 further includes a computer program stored in the memory 1303 and executable on the processor 1301. When executed by the processor 1301, the computer program implements steps of any one of the methods 100 to 900.

In FIG. 13, the bus architecture may include any number of interconnected buses and bridges, and connect together various circuits of one or more processors represented by the processor 1301 and memories represented by the memory 1303. The bus architecture can also connect together various other circuits such as peripheral device circuits, voltage regulator circuits, and power management circuits. This is well known in the art, and therefore, is not further described herein. The bus interface provides an interface between the bus and the transceiver. The transceiver 1302 may be a plurality of components including a transmitter and a receiver, and provide a unit configured to communicate with various other devices over a transmission medium.

The processor 1301 is responsible for managing the bus architecture and general processing. The memory 1303 may be configured to store the data used when the processor 1301 performs an operation.

An embodiment of the present disclosure further provides a computer-readable storage medium. The computer-readable storage medium stores a computer program. When executed by a processor, the computer program implements processes of any one of the method 100 to the method 900 and achieves the same technical effect, details of which are omitted herein for brevity. Examples of the computer-readable storage medium may include a non-transitory computer-readable storage medium, for example, read-only memory (Read-Only Memory, ROM for short), random access memory (Random Access Memory, RAM for short), magnetic disk, or optical disk.

It is hereby noted that the terms "include", "comprise", and any variation thereof that are used herein are intended to cover a non-exclusive inclusion relationship, whereby a process, method, item, or device that includes a series of elements not only includes such elements, but also includes other elements not expressly specified or also includes inherent elements of the process, method, item, or device. Unless otherwise expressly specified, reference to a process, method, item, or device that "includes" or "comprises" a specific number of elements does not preclude that other identical or equivalent elements exist in the process, method, item, or device.

From the description of the embodiments above, a person skilled in the art clearly understands that the methods in the embodiments may be implemented by software in addition to a necessary universal hardware platform or by hardware. In most circumstances, the implementation by software in addition to a necessary universal hardware platform is preferred. Based on such an understanding, the essence of the technical solutions of the present disclosure or the contribution made by the technical solutions to the prior art may be manifested by a computer software product. The computer software product is stored in a storage medium (such as ROM/RAM, magnetic disk, or optical disk), and includes several instructions that cause a terminal (such as mobile phone, computer, server, air conditioner, or network device) to implement any one of the methods described in the embodiments of the present disclosure.

Although the embodiments of the present disclosure have been described above with reference to drawings, the present disclosure is not limited to the specific embodiments. The specific embodiments are merely illustrative rather than restrictive. As enlightened by the present disclosure, a person of ordinary skill in the art may make many other variations without departing from the spirit of the present disclosure and the scope protected by the claims, and the variations fall within the protection scope of the present disclosure.

What is claimed is:

1. A tracking area update (TAU) method based on a mobile integrated access and backhaul (IAB) node, wherein the method is performed by the mobile IAB node and the method comprises:
    receiving, from a donor IAB node, first tracking area code (TAC) list information; and
    initiating a TAU procedure based on the first TAC list information in a case that a new tracking area identity (TAI) is discovered, wherein the TAU procedure is used for making a first access and mobility management function (AMF) update location information of a terminal device, and the terminal device resides in a cell provided by the mobile IAB node;
    sending second TAC list information to a donor IAB node, wherein the second TAC list information is used for being broadcast by the mobile IAB node, and the second TAC list information is further used for being added by the donor IAB node into the first TAC list information that is broadcast by the donor IAB node.

2. The method according to claim 1, wherein, before the initiating the TAU procedure in a case that a new TAI is discovered, the method further comprises:
   sending indication information to a donor IAB node and/or a second AMF, wherein the indication information is used for indicating that the mobile IAB node is a mobile node in type; and the second AMF is an AMF to which the mobile IAB node is homed.

3. The method according to claim 1, further comprising:
   receiving TAC configuration information from a donor IAB node, wherein the TAC configuration information is used for configuring second TAC list information, and the second TAC list information is used for being broadcast by the mobile IAB node; and
   performing configuration based on the TAC configuration information;
   wherein the initiating the TAU procedure in a case that a new TAI is discovered comprises:
   sending TAU request information to a second AMF in a case that the new TAI is discovered, wherein the TAU request information comprises the new TAI and the second TAC list information,
   wherein, the new TAI is used by the second AMF to configure updated TAI list information for the mobile IAB node; the second TAC list information is used by the first AMF to establish an association between the new TAI and the second TAC list information, the second AMF is an AMF to which the mobile IAB node is homed, and the second AMF is further configured to send the second TAC list information to the first AMF.

4. The method according to claim 1,
   wherein, the second TAC list information is further used for:
      being reported by the donor IAB node to a second AMF, wherein the second AMF is an AMF to which the mobile IAB node is homed.

5. The method according to claim 1, further comprising:
   receiving request information from a donor IAB node, wherein the request information is used for requesting second TAC list information, and the second TAC list information is used for being broadcast by the mobile IAB node; and
   sending the second TAC list information to the donor IAB node.

6. The method according to claim 1, further comprising:
   receiving RRC configuration information, wherein the RRC configuration information is used by the mobile IAB node to add the first TAC list information into second TAC list information; and
   adding the first TAC list information into the second TAC list information, wherein the second TAC list information is used for being broadcast by the mobile IAB node.

7. The method according to claim 1, wherein, after the initiating the TAU procedure, the method further comprises:
   receiving TAI configuration information, wherein the TAI configuration information is used for configuring updated TAI list information for the mobile IAB node; and
   performing configuration based on the TAI configuration information;
   wherein, after the receiving TAI configuration information, the method further comprises:
   receiving a paging request from a donor IAB node, and sending a paging message specific to a target terminal device based on the paging request,
   wherein, the paging request is sent by the first AMF to the donor IAB node based on the TAI list information;
   wherein the paging request comprises an indication message, and the indication message is used for indicating the mobile IAB node,
   wherein, the donor IAB node sends the paging request to the mobile IAB node alone.

8. A tracking area update (TAU) method based on a mobile integrated access and backhaul (IAB) node, wherein the method is performed by a donor IAB node and the method comprises:
   sending first tracking area code (TAC) list information,
   wherein, the first TAC list information is used for making a mobile IAB node initiate a TAU procedure in a case that a new tracking area identity (TAI) is discovered, wherein the TAU procedure is used for making a first access and mobility management function (AMF) update location information of a terminal device, and the terminal device resides in a cell provided by the mobile IAB node;
   receiving second TAC list information, wherein the second TAC list information is used for being broadcast by the mobile IAB node; and
   adding the second TAC list information into the first TAC list information that is broadcast by the donor IAB node.

9. The method according to claim 8, further comprising:
   receiving indication information, wherein the indication information is used for indicating that the mobile IAB node is a mobile node in type.

10. The method according to claim 8, further comprising:
    sending TAC configuration information, wherein the TAC configuration information is used by the mobile IAB node to configure second TAC list information, and the second TAC list information is used for being broadcast by the mobile IAB node.

11. The method according to claim 8, further comprising:
    initiating a reporting process to a second AMF based on the second TAC list information, wherein the second AMF is an AMF to which the mobile IAB node is homed;
    wherein the second TAC list information is:
    sent by the mobile IAB node; or
    sent by a source donor IAB node of the mobile IAB node.

12. The method according to claim 8, further comprising:
    sending request information, wherein the request information is used for requesting second TAC list information, and the second TAC list information is used for being broadcast by the mobile IAB node; and
    receiving the second TAC list information.

13. The method according to claim 8, further comprising:
    sending RRC configuration information, wherein the RRC configuration information is used by the mobile IAB node to add the first TAC list information into second TAC list information, and the second TAC list information is used for being broadcast by the mobile IAB node.

14. The method according to claim 8, wherein the first TAC list information is used by the mobile IAB node to add the first TAC list information into second TAC list information, and the second TAC list information is used for being broadcast by the mobile IAB node.

15. The method according to claim 8, further comprising:
    receiving a paging request from the first AMF, wherein the paging request is sent by the first AMF based on TAI list information updated by the mobile IAB node, the paging request comprises an indication message, and the indication message is used for indicating the mobile IAB node; and sending the paging request to the mobile IAB node, wherein the paging request is used as a basis for the mobile IAB node to send a paging message specific to a target terminal device.

16. The method according to claim 8, further comprising:

receiving a paging request from the first AMF, wherein the paging request is sent by the first AMF based on TAI list information updated by the mobile IAB node; and configuring each cell corresponding to the first TAC list information and an IAB cell controlled by the donor IAB node to send a paging message specific to a target terminal device.

17. A tracking area update (TAU) method based on a mobile integrated access and backhaul (IAB) node, wherein the method is performed by a first access and mobility management function (AMF) and the method comprises:

updating location information of a terminal device in a case that the mobile IAB node initiates a TAU procedure, wherein, the terminal device resides in a cell provided by the mobile IAB node; and the TAU procedure is a procedure initiated by the mobile IAB node based on received first tracking area code (TAC) list information in a case that a new tracking area identity (TAI) is discovered;

wherein the second TAC list information is used for being broadcast by the mobile IAB node, and the second TAC list information is further used for being added by the donor IAB node into the first TAC list information that is broadcast by the donor IAB node.

18. The method according to claim 17, wherein the updating location information of a terminal device in a case that the mobile IAB node initiates a TAU procedure comprises:

receiving TAI list information coming from a second AMF and updated by the mobile IAB node, wherein the second AMF is an AMF to which the mobile IAB node is homed;

sending a paging request to a donor IAB node based on the TAI list information, wherein the paging request is used as a basis for the donor IAB node to send a paging message specific to a target terminal device.

19. The method according to claim 17, further comprising:

receiving second TAC list information reported by a donor IAB node, wherein, the second TAC list information is:

sent by the mobile IAB node to the donor IAB node; or sent by a source donor IAB node of the mobile IAB node to the donor IAB node.

20. The method according to claim 17, further comprising:

receiving second TAC list information from a second AMF, wherein the second AMF is an AMF to which the mobile IAB node is homed, and the second TAC list information is used for being broadcast by the mobile IAB node; and establishing an association between the mobile IAB node and the second TAC list information.

* * * * *